Jan. 26, 1943.  R. B. HUYETT  2,309,115
ABRADING APPARATUS
Filed Nov. 17, 1938  8 Sheets-Sheet 1
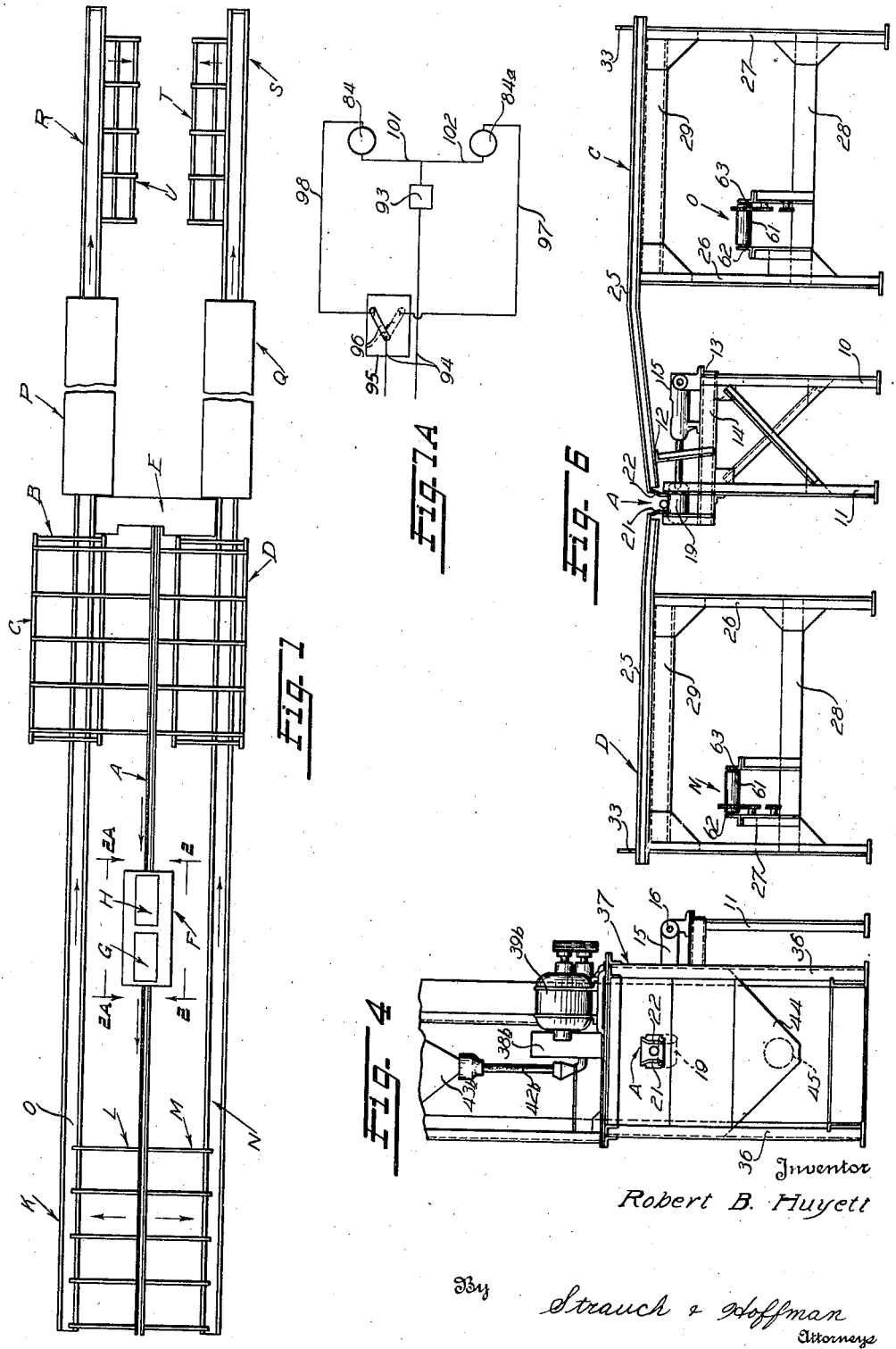
Inventor
Robert B. Huyett
By Strauch & Hoffman
Attorneys

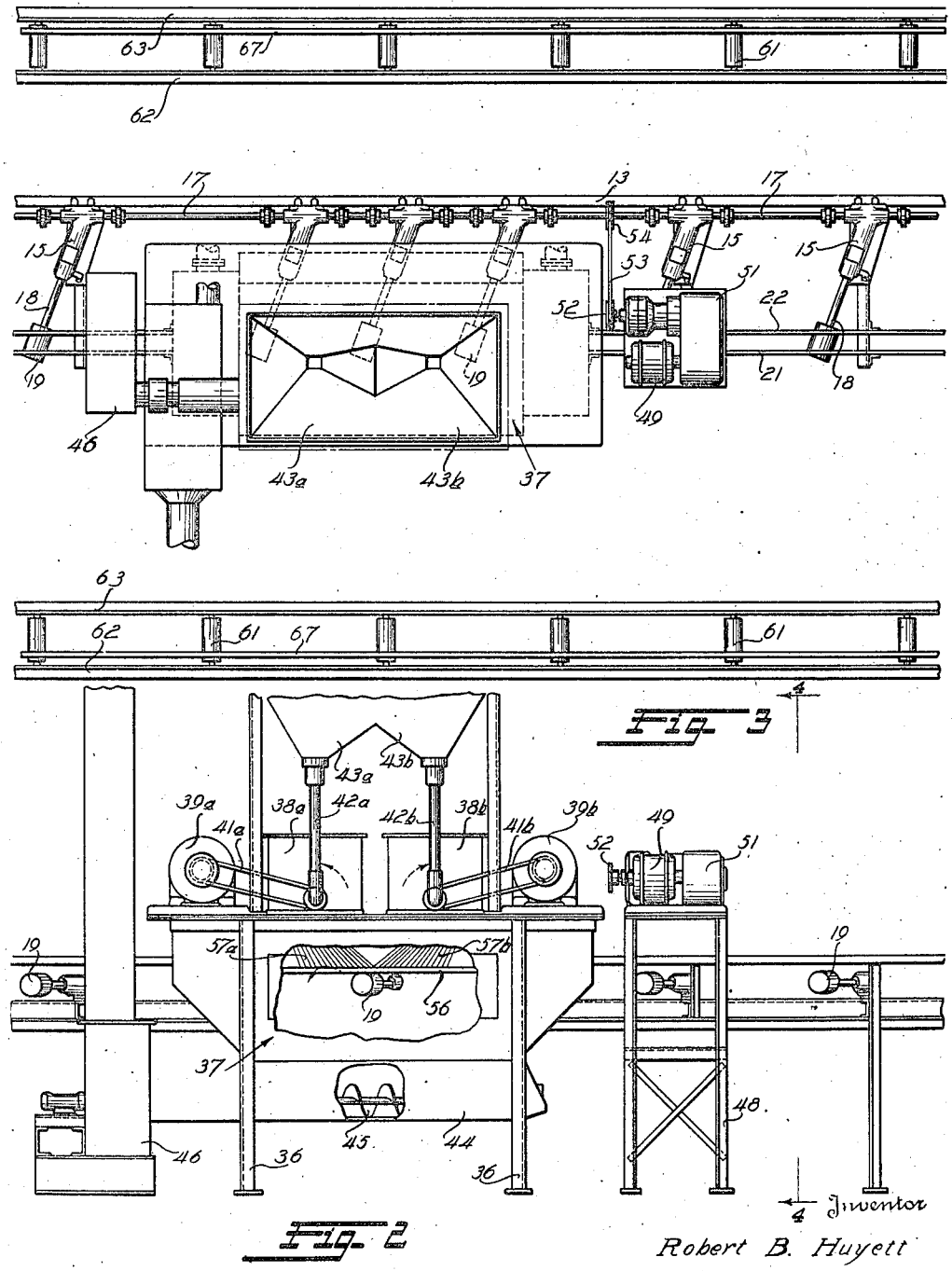

Jan. 26, 1943.        R. B. HUYETT        2,309,115
ABRADING APPARATUS
Filed Nov. 17, 1938        8 Sheets-Sheet 3

Inventor
Robert B. Huyett

By Strauch & Hoffman
Attorneys

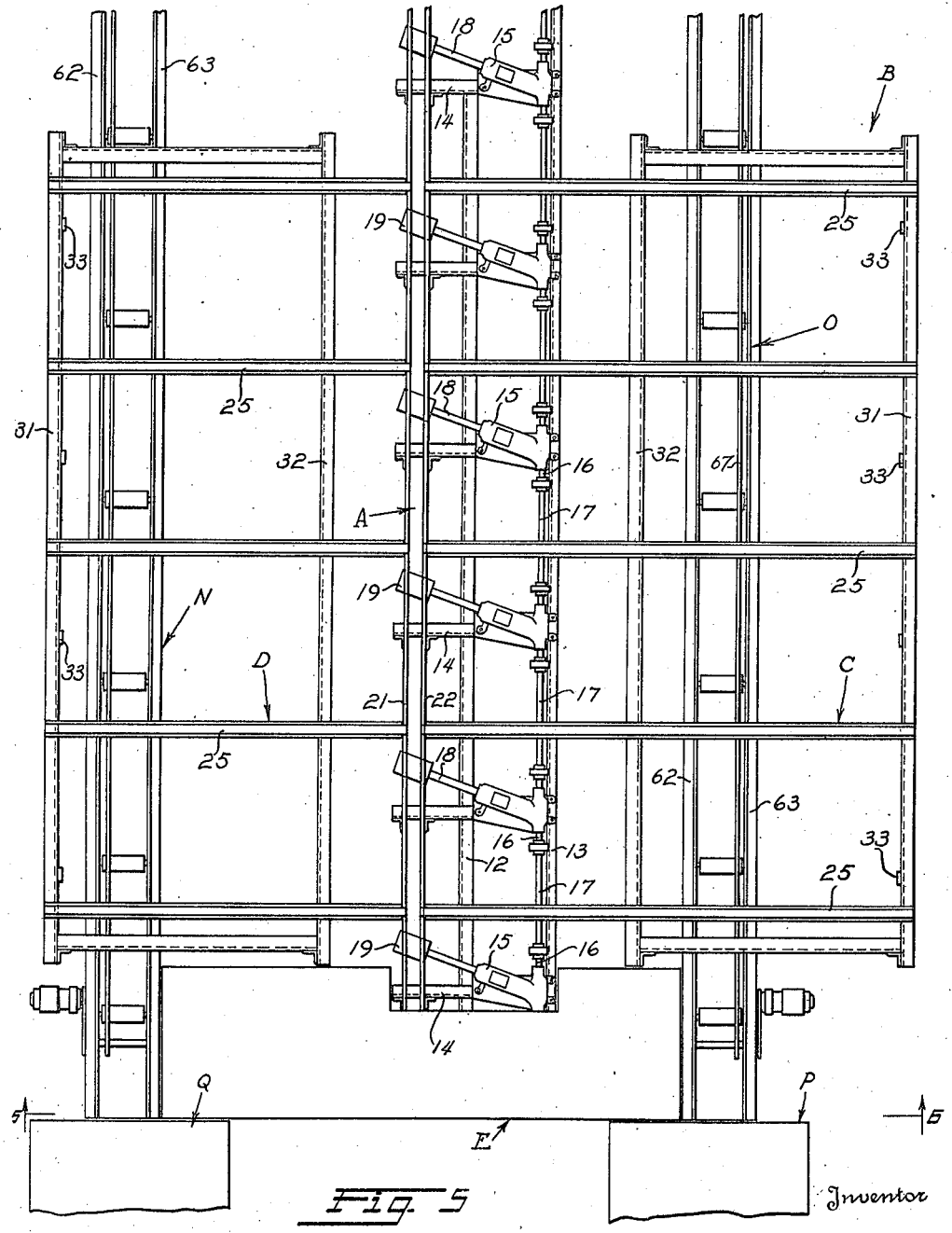

Jan. 26, 1943.  R. B. HUYETT  2,309,115
ABRADING APPARATUS
Filed Nov. 17, 1938  8 Sheets-Sheet 8

Inventor
Robert B. Huyett

By Strauch & Hoffman
Attorneys

Patented Jan. 26, 1943

2,309,115

UNITED STATES PATENT OFFICE 2,309,115

ABRADING APPARATUS

Robert B. Huyett, Hagerstown, Md., assignor to Pangborn Corporation, Hagerstown, Md., a corporation of Maryland Application November 17, 1938, Serial No. 241,074

4 Claims. (Cl. 51—9)

This invention relates to abrading apparatus and it is more particularly concerned with apparatus for abrading or blast cleaning rods, pipe and similar elongated articles of scale and other surface coatings and incrustation.

Although machines have been heretofore proposed for this general purpose, they have not been altogether successful because they fail to thoroughly clean the rod or pipe and moreover do not clean it with sufficient speed to adapt it to present day quantity production methods. A further shortcoming of the prior machines resides in the fact that they are not sufficiently flexible to handle various sizes of rod or pipe, much less handle various sizes simultaneously, with the result that those machines could only find application where large quantities of uniform sized rods or pipe were to be cleaned—the machine being substantially worthless where only comparatively small quantities of widely varying sized rod or pipe are involved.

It is accordingly the major object of this invention to provide an abrading apparatus which will efficiently remove scale and other extraneous material from the surfaces of rod or pipe of various sizes, and at speeds sufficiently high to adapt them to quantity production methods, and which are rugged in design and have a long useful life.

Another important object is to provide an apparatus for abrading rod or pipe which is so designed that the material may be fed to it from two separate sources and means are provided for segregating the material after it has been cleaned.

A further object is to provide a rod cleaning apparatus embodying novel mechanism for handling the rods before and after they pass through the abrading zone, and which makes it unnecessary to manually manipulate the material during any part of the cleaning operation.

Another object is to provide a rod cleaning machine with novel transfer mechanism for selectively lifting and transporting the rods, after they emerge from the cleaning operation, to two different rod handling mechanisms.

A further important object of the invention is to provide apparatus for blast cleaning rods, pipes and the like, embodying biased conveying rollers for simultaneously rotating and advancing the rods endwise, and a novel guide assembly which compels the rods to travel in a predetermined path and yet exerts a minimum of resistance to forward movement and rotation of the rods.

In prior apparatus it has been necessary to pass square or polygonal sectioned rods through several times, turning the rod over between each pass, in order to present a fresh surface to the blast. This not only entails expensive manual labor but also seriously curtails the quantity of work that may be handled by the machine, and it is accordingly a further object to provide an apparatus for automatically cleaning rods and which will efficiently advance and rotate rods, pipes and the like of various cross-sectional shapes, including square and polygonal rods.

Another object is to provide an apparatus which will advance and rotate under a blast stream rods of various cross-sectional shapes, and which is also operative to simultaneously rotate, advance and blast clean rods of circular section, without allowing the rods to interfere with each other.

A further object is to provide an apparatus for blast cleaning rods of circular or polygonal section simultaneously or consecutively and which embodies a device for segregating the rods into two different groups after they have been blast cleaned.

A still further object is to devise a novel method of processing rods, bars, pipes and the like, to free their surfaces of adhering scale and other extraneous material.

Further objects will become apparent as the specification proceeds in connection with the annexed drawings, and from the appended claims.

In the drawings:

Figure 1 is a top plan view diagrammatically illustrating the apparatus of the invention and certain parts have been abbreviated in order to simplify the showing;

Figure 2 is a front elevational view of the blasting chamber section of the apparatus, and it is taken substantially along the line 2—2 of Figure 1, and the housing has been broken away to illustrate the manner in which the abrasive streams are projected against the work.

Figure 3 is a top plan view of the apparatus shown in Figures 2 and 2A, and in order to clarify the disclosure certain parts of the structure shown in those figures have been omitted.

Figure 4 is an end elevational view of the cabinet of the blast chamber section of the apparatus, and it illustrates the parts as they appear when viewed along the line 4—4 of Figure 2.

Figure 5 is a top plan view of the loading station of the apparatus.

Figure 6 is a sectional view of the loading station of the apparatus and is taken substantially on the line 6—6 of Figure 5.

Figure 7A is a diagrammatic view of the circuit employed to control the transfer motors.

Figure 11 is a top plan diagrammatic view of a modified form of machine and shows the conveying and roll turning assembly. The impingement pattern of the abrasive projecting wheels are also illustrated in this figure.

Figure 12 is a diagrammatic side elevational view of the abrasive throwing wheels employed in the machine of Figure 11, and it illustrates the relationship between the blast streams and their impingement patterns shown in that figure.

Figure 15 is an enlarged end elevational view of one of the roll assemblies employed in the apparatus looking in the direction of rod travel.

Figure 16 is a view similar to Figure 15 but shows a modified form of roll assembly.

Figure 17 is a view similar to Figure 16, but shows a further modified form of roll assembly of the invention, and the view is taken looking in the direction of travel of the rods.

Figure 18 is a top plan view of the roll assembly shown in Figure 17, and

Figure 19 is a side elevational view of the roll assembly shown in Figure 17, and shows the parts as they appear when viewed from the right hand side of the figure.

Figure 20 is an end elevation of a further modified form of roll assembly of the invention, looking in the direction of travel of the articles.

Figure 2A:
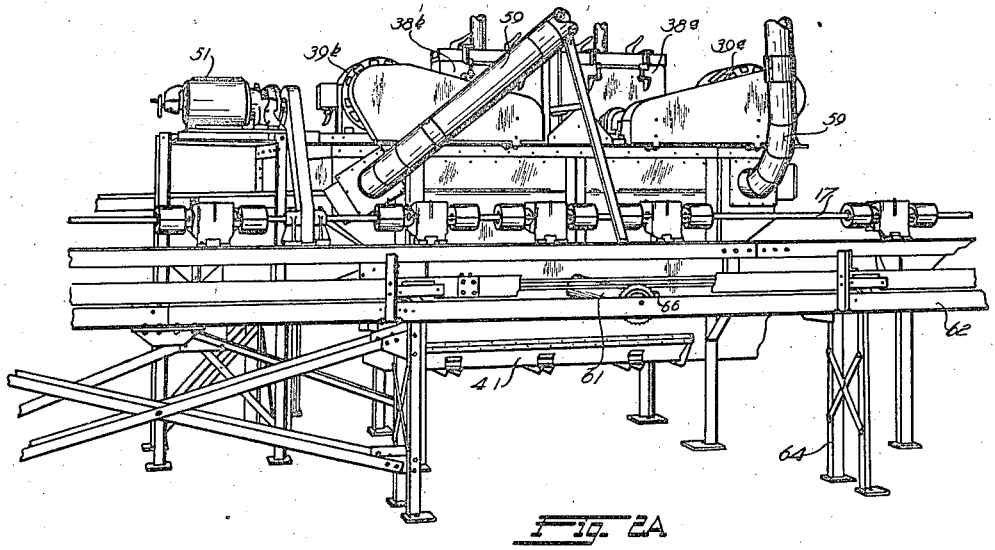
Figure 2A is a perspective view of the rear of the blasting chamber section of the apparatus and is taken in the direction indicated by the line 2A—2A of Figure 1.

With continued reference to the drawings, wherein like reference characters have been employed to designate like parts throughout the several views thereof, and with particular reference to Figure 1, the apparatus of the invention is particularly designed for the handling of rods, pipes and other elongated articles, and though most of the material treated is cylindrical in shape it is to be understood that it may be employed to efficiently clean non-circular section and rods having flattened sides, fins or other surface projections.

The apparatus embodies a main conveyor A, onto which the rods are fed at a loading station designated as B. A pair of racks C and D are employed for feeding rods onto the conveyor from two different piles or groups located on opposite sides of the conveyor. A platform E is provided adjacent the loading station where an operator may stand and feed the rods into the conveyor. As the rods are progressively transported by the conveyor A in the direction indicated by the arrow, they are simultaneously rotated about their longitudinal axes by a biased or "quartering" roller mechanism to be hereinafter described, and they enter a blasting chamber or housing F, on which a pair of abrasive propelling rotors G and H are mounted. Wheels G and H project fan-shaped streams of abrasive downwardly in the housing in alignment with, and parallel to the rods as they pass through the housing and effectively clean the surfaces thereof as they are rotated and advanced through the housing. As the cleaned rods emerge from the housing they enter a transfer station designated as K, where a transfer mechanism is selectively operated to lift the rods and transfer them laterally by means of inclined ways L and M to either one of two return conveyors N and O, which extend parallel to main conveyor A but travel in the opposite direction.

The cleaned rods are transported by the return conveyors N and O and enter rod houses P and Q, in which they are reduced to final size, are straightened and have any other final operation performed upon them. Upon emerging from rod houses P and Q, the rods enter unloading stations R and S, where an unloading mechanism lifts them out of the conveyor and transports them to baling racks T and U, where they are baled for shipment.

The apparatus therefore embodies completely automatic means for transporting rods, pipes or the like to the blasting chamber, through the blasting chamber laterally onto two return conveyors, through rod houses for final finishing operations and then laterally to a baling station where they are prepared for shipment, no manual operation or manipulation of the rods being necessary from the time they leave the loading station until the time they enter the baling rack.

The various parts of the apparatus will now be described in detail and they will be taken up separately in order to facilitate an understanding of the invention.

*Loading mechanism*

Referring to Figures 5 and 6, extending from the loading station to the transfer station is a conveyor supporting frame constructed of uprights 10 and 11, longitudinal members 12 and 13 and cross members 14. Supported on cross members 14 are gear boxes 15 and journaled in each gear box is a shaft 16, and they are interconnected by an intermediate shaft 17 and a pair of universal joints. Also journaled in each housing 15 is a shaft 18 carrying a roller 19. Rollers 19 are preferably rubber-faced in order to improve the frictional grip between them and the rods or pipes. Shafts 16 and 18 are intergeared within housing 15 by means of a pair of bevel gears (not shown). Shaft 16 is driven by a prime mover in a manner to be pointed out hereinafter.

Rollers 19 are accordingly mounted for rotation with their axes horizontal and on a "bias" with respect to the direction of travel of the rods through the machine, and this effects rotation of the latter about their axes in the direction indicated in Figure 2, as they are advanced endwise through the apparatus. In this position, each of rollers 19 is capable of point supporting the rods independently of any remaining rollers. In order to maintain the rods on the rollers 19 and guide them in a fixed path through the machine, a pair of plate-like guideways 21 and 22 are mounted above the rollers and in alignment therewith, so that they, in effect, cooperate with the rollers to define a trough. In order to further reduce the friction between the rods and the guides as they pass through the machine they may be provided at certain points with rollers in accordance with a later described form of the invention.

The rods to be cleaned are placed upon racks C and D, consisting of a plurality of transverse rails 25 supported upon a framework constructed of vertical supports 26 and 27, cross bars 28 and 29, and longitudinal members 31 and 32. In order to prevent the rods from escaping out of the side of the machine stop members 33 are secured to longitudinal members 31.

As seen in Figure 6, rails 25 curve downwardly adjacent the conveyor trough and the rods to be treated are placed upon the rails and are preferably fed manually along the rails into the trough. By using two racks, two batches of different sized rods or pipes may be supported in the loading station and be fed consecutively into the conveyor, and the advantages resulting from this construction will be hereinafter pointed out.

Blast chamber and associated parts

Supported on a plurality of uprights 36 (Fig. 2) is a blast cabinet or housing 37 and it is provided with entrance and exit openings through which the conveyor mechanism A extends. Mounted on the roof of housing 37 are a pair of abrasive propelling wheels 38a and 38b, which rotate in the directions indicated by the arrows and propel abrasive downwardly upon the rods passing through the cabinet. The abrasive propelling wheels may be of any desired character. For instance they may be bladed wheels of the character shown in Keefer Patents Nos. 2,108,005 and 2,108,006, dated February 8, 1938, or they may be bladeless wheels of the character shown in Keefer Patent No. 2,116,153, dated May 3, 1938. Since full disclosures of these wheels are found in the aforementioned patents they will not be further described. Also, if desired more or less than two wheels may be employed, depending upon the requirements of the particular installation at hand.

A pair of motors 39a and 39b are also mounted on the roof of housing 37 and they are drivingly connected to the rotors by means of driving belts 41a and 41b. They preferably drive the rotors in the neighborhood of 2500 R. P. M. Abrasive is supplied to the wheels through a pair of conduits 42a and 42b, and they are in turn fed by a pair of abrasive storage hoppers 43a and 43b.

The bottom portion of housing 37 is formed as a hopper 44 and a screw conveyor 45 is located therein and conveys the spent abrasive to the bottom of an elevator 46. The elevator carries the spent abrasive, which is mixed with foundry sand, nails, fines and other extraneous material, to an abrasive cleaning mechanism (not shown) and which may be of any desired character, for instance, of the type shown in Huyett Patent No. 1,994,610, dated March 19, 1935. The abrading mechanism therefore works on a continuous cycle, because the spent abrasive is promptly picked up, cleaned and returned to the wheels by way of conduits 42a and 42b.

Mounted on a supporting stand 48 is a motor 49 having a variable speed drive 51 coupled thereto. Speed reducer 51 is provided with a drive sprocket 52, which, through a sprocket chain 53 (Fig. 3), drives a sprocket 54 carried by one of the sections of shaft 17. Motor 49 therefore, through the intermediate shafts 16 and 17, drives all of the shafts 18 for rollers 19 at the same speed. It is not necessary that rollers 19 be of equal diameter but if they are of unequal size the gearing should be so designed as to drive them at synchronous peripheral speed.

Blasting operation

As seen in Figure 2, a rod 56 is in blasting position and is progressing from right to left and is simultaneously rotating in the direction indicated by the arrow. In all abrasive propelling wheels the discharge stream is more or less fan-shaped, and the stream itself is comparatively narrow, measured in the direction of the axis of the wheel. The wheels in this instance are so disposed in the cabinet that the fan-shaped streams are in alignment, and in substantial parallelism with the rod undergoing treatment, in order that the full body of the stream may act upon the work. In Figure 2 the blast streams are designated 57a and 57b and they are observed to act upon the work 56 in opposite directions. In other words, the blast stream 57b is directed downwardly but it also possesses a component of velocity to the left and hence in the direction of advance of the work. Blast stream 57a on the other hand possesses a component of velocity to the right, and hence is counter to the direction of travel of the work. The two wheels clean the opposite sides of the rods and cooperate to effect an extremely efficient cleaning of the rods throughout their length and produce an excellent finish. The disclosed wheel assembly is therefore preferred, although otherABC wheel arrangements may be utilized and yet the advantages of the other features of the invention fully realized.

If it is found that the work is extremely difficulty to clean, variable speed drive mechanism 51 may be adjusted to decrease the speed of rotation of rollers 19 so as to subject the work to the action of the wheels for a longer cleaning period. On the other hand, however, if desired the work may be merely passed through the machine two or more times, without reducing the speed of the conveyor. In view of the fact that the work is rotated and simultaneously advanced through the blasting chamber, any size of rod up to the capacity of the trough may be cleaned.

In order to carry away the dust developed during the blasting operation, cabinet 37 is preferably provided with a pair of suction conduits 59 (Fig. 2A), which are preferably tapped into the housing 37 adjacent the intake and discharge openings, so that a current of air is drawn into housing 37 through each opening. The air currents therefore tend to carry into the housing any dust that may be freed from the work and migrates toward the openings. Conduits 59 are led to the dust collector or the like for cleaning the dust-laden air.

Transfer mechanism

After the abraded rods emerge from the blast chamber they are conveyed by rollers 19 to a transfer station previously described, and from it they are selectively transported to the return conveyors N and O. The latter termed "return" conveyors because the machine is so laid out for economy of space as to return the rods to the rod houses. It is to be understood however that where space permits the machine need not be "doubled-back" upon itself but may be laid out in a straight line, and in that case the conveyors would all transport the rods in the same direction.

Figure 8:
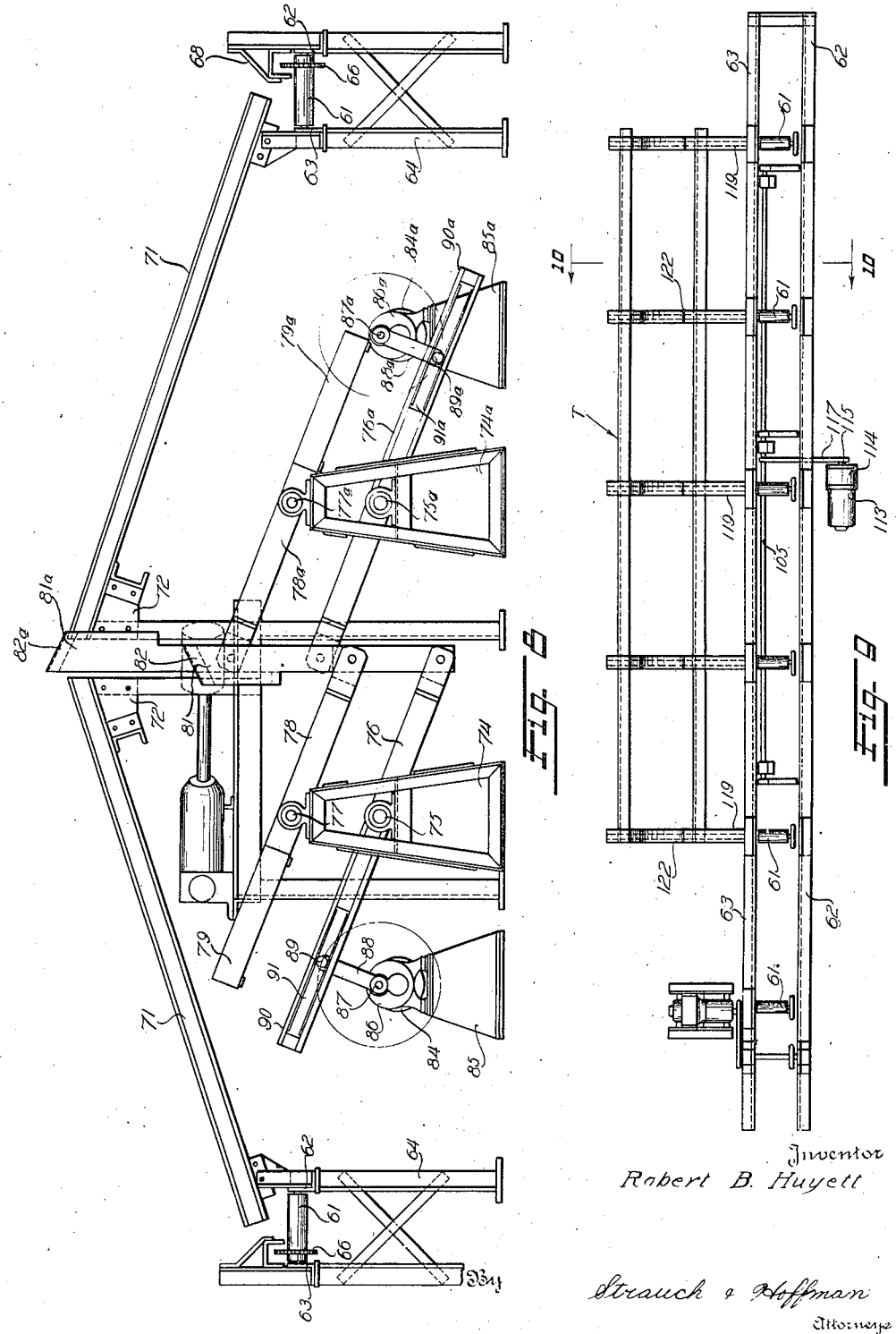
Figure 8 is an end elevational view of the transfer station of the apparatus and illustrates the parts as they appear when viewed along the line 8—8 of Figure 7, and one of the transfer knives or lifters is shown in raised or transferring position.
Figure 9:
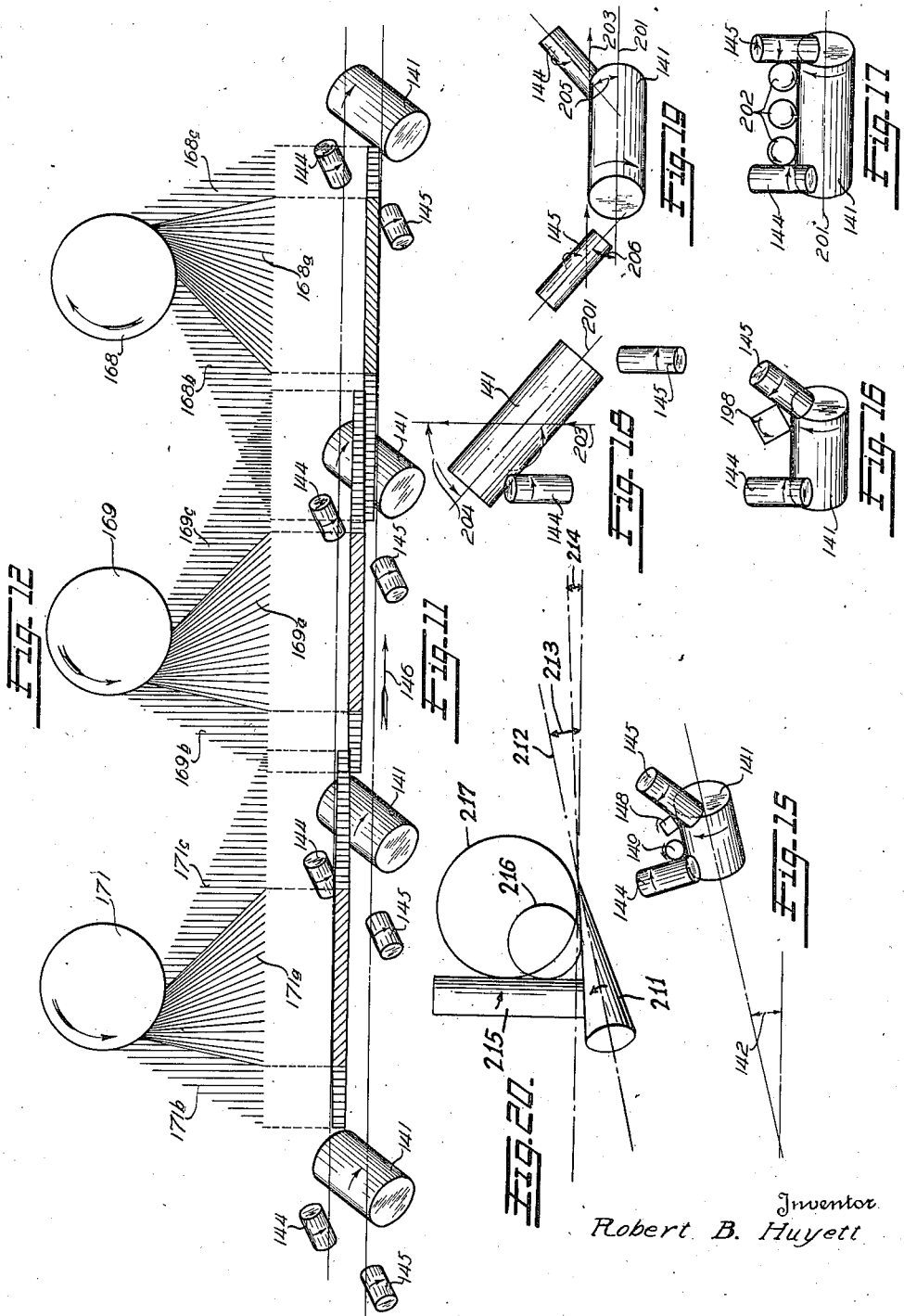
Figure 9 is a top plan view of one of the return conveyors at the unloading station.

The return conveyors are identical in construction and they comprise a plurality of rollers 61 (Fig. 9) journaled between a pair of longitudinal angle members 62 and 63. The latter may be supported in any suitable manner as by means of uprights 64 (Fig. 8). Each roller 61 is provided with a sprocket 66 and a sprocket chain 67 (Fig. 5) extending from one end of the conveyor to the other and engages all of the sprockets. The sprocket chain is energized by means of a motor or any other suitable prime mover (not shown), and the peripheral speed is comparable with that of the speed of the main conveyor, so as to enable them to remove the rods as fast as they have been abraded. If the speed of the main conveyor A is increased or decreased, then the speed of the return conveyor is preferably correspondingly varied. In order to prevent the rods from contacting the drive sprockets and chain, a guard 68 (Fig. 8) having an inclined upper surface, is mounted on structure 64 and extends down over the sprockets and drive chain.

Secured to the top of each conveyor supporting structure 64 are a plurality of inclined rod transporting rails 71, which are secured at their inner ends to a pair of supporting structures 72, located at either side of the conveyor.

Located at either side of the conveyor trough is a transfer mechanism, the transfer mechanisms being so designed that when one of them is actuated it will deflect the bars or rods onto one of the return conveyors, and actuation of the other transfer mechanism will effect transfer of the rods to the other return conveyor. As the transfer mechanisms are identical in construction, only one of them will be described and similar reference characters with the subscript a will be applied to the other.

Rigidly supported on the floor of the building in which the apparatus is located are a pair of standards 74 (Fig. 8), and journaled thereon for rocking movement is a shaft 75 carrying a pair of levers 76. Journaled above levers 76 is a shaft 77 carrying a pair of levers 78 having counterweights 79. Pivotally connected to the free ends of each pair of levers 76 and 78 is an ejector or transfer knife or lifter 81, having an inclined lifting surface 82. The relationship between the pivots 75 and 77 and the pivotal connections between levers 76 and 78 and member 81 is such that the system defines a parallelogram and that when levers 76 and 78 are rocked, member 81 will undergo substantially vertical movement.

Figure 7:
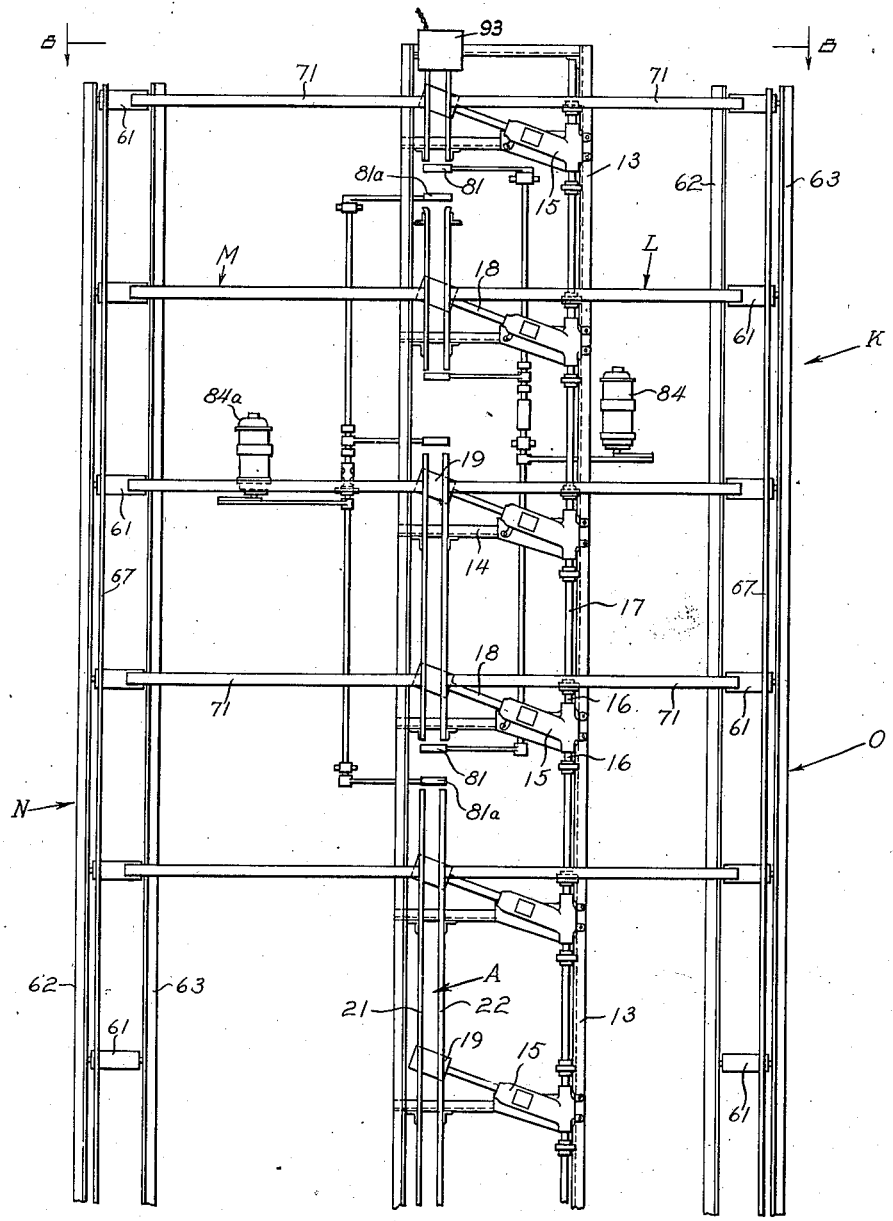
Figure 7 is a top plan view of the transfer station of the apparatus.

As seen in Figure 7, members 81 and 81a reciprocate between, and without interference from rollers 19, so as to cooperate directly with any rod that may be disposed on the conveyor. Counterweights 79 are preferably of sufficient mass to approximately counterbalance the weight of members 81 and the levers, so that only the weight of the rod or pipe need be lifted when the levers are actuated.

Levers 76 and 78 may be actuated by any suitable mechanism, as for instance by a pneumatic or hydraulic piston and cylinder assembly, a solenoid or the like, but I preferably employ an electric motor 84 mounted on a support 85 and having a speed reducer 86. The speed reducer has an output shaft 87 and rigidly secured thereto is a crank arm 88 which carries a crank pin 89 at its free end. Lever 90 is rigidly secured to shaft 75 intermediate levers 76 and is formed with a guideway 91 in which crankpin 89 is adapted to operate.

From the foregoing, it is apparent that upon each rotation of crank 88, levers 76 and 78 will undergo a complete cycle of movement from the position shown in Figure 8 to fully raised or transferring position and then back to the position shown. In Figure 8 transfer member 81 is shown in lowered position below the level of the bottom of the conveyor A, and transfer member 81a is shown in transferring position, with its surface 82a above the level of rails 71.

The transfer mechanism may be controlled in any suitable manner. I preferably employ a mechanism controlled by the movement of the rods for controlling the circuits of motors 84 and 84a. Referring to Figures 7 and 7A, a limit switch 93 is mounted in the end of conveyor A directly in the path of movement of the rods as they reach the end of conveyor A, so that it will be closed when a rod is conveyed into contact with it. The manner in which the switch 93 is incorporated in the circuit for motors 84 and 84a is shown in Figure 7A. The main supply line 94 is connected to a switch 95 having a manual actuating handle 96. Switch 95 is preferably located near platform E and may be actuated to selectively connect power line 94 by way of leads 97 and 98, to motors 84 and 84a. The other side of the line 94 is connected to limit switch 93, and the latter is connected through lines 101 and 102 to motors 84 and 84a, respectively.

From the foregoing it is apparent that switch 93 must be closed before either of the motors can be energized. Assuming that a rod emerging from the blasting chamber contacts switch 93, the circuit will be closed and motor 84 or motor 84a will automatically go into action and lift the rod into return conveyor N or O, depending upon the position of switch 95. The operator therefore predetermines which return conveyor to which he desires to transfer the cleaned rod and operates handle 96 of switch 95 accordingly. Thereafter, engagement of the rods with switch 93 will automatically close the circuits and actuate the proper motor to effect the desired transfer. The circuit also includes a mechanism controlled in accordance with the position of crank pins 89 and 89a to automatically stop the motor exactly at the end of one revolution, so that the transfer mechanism is conditioned for another transfer operation after the preceding transfer has been effected. The motors also embody magnetic brakes, well known in the art, for stopping them promptly when their circuits are broken.

*Unloading mechanism*

Figure 10:
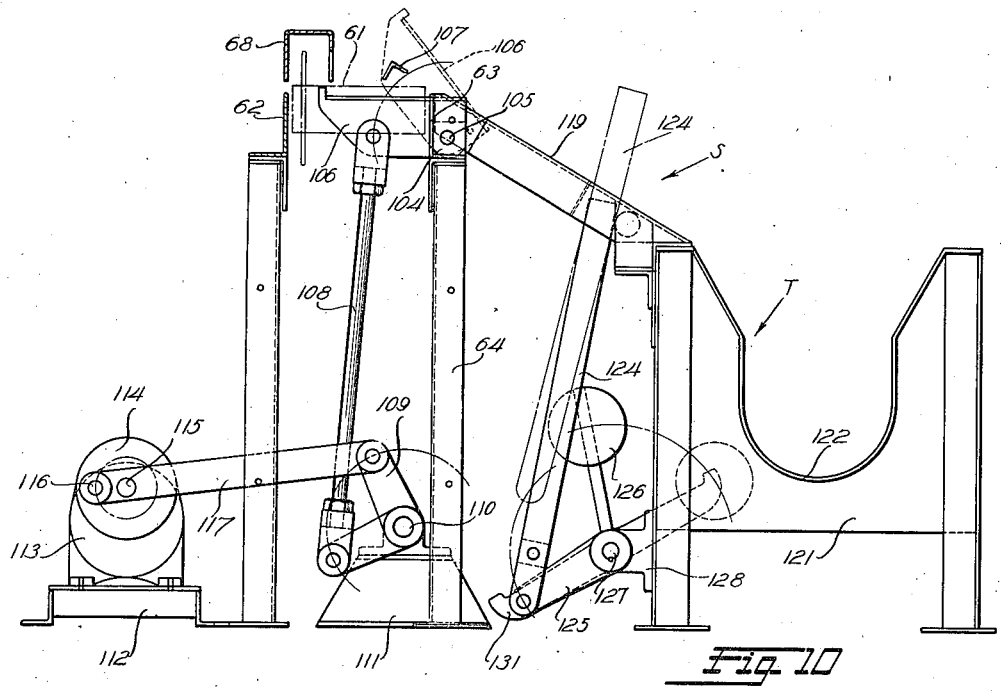
Figure 10 is a transverse sectional view taken substantially on the line 10—10 of Figure 9, and it illustrates both the unloading mechanism and the rod arresting mechanism in operative position.

Referring more particularly to Figure 10, each return conveyor, after it emerges from the rod houses P and Q, terminates in an unloading station R and S, where the rods are ejected from the conveyor and are transferred to a baling rack.

Mounted for rocking movement on one of the longitudinal members 63 in brackets 104 is a shaft 105. Rigidly secured to shaft 105 are a plurality of lifter or ejector members 106 and guard member 68 is cut away at suitable points to allow them to swing upwardly without interference. Inadvertent escape of the rods from rollers 61 is prevented by a plurality of angle members 107, and they are likewise cut away at intervals to allow members 106 to swing past them. Lifter members 106 are actuated by means of a link 108 which is pivotally connected to a bell crank lever 109 journaled on a shaft 110 carried by a base 111. Mounted on a base 112 is a motor 113 having an integrally connected speed reducing gear mechanism 114. Speed reducer 114 terminates in a shaft 115 having a crank pin 116 which is connected to bell crank 109 by means of a link 117. Therefore, upon each revolution of crank pin 116, members 106 will raise from the full line position shown in Figure 10 to the dotted line position and will then return to the full line position, and the motor circuit is so designed as to stop the ejector members at the end of the cycle.

The rods ejected from the apparatus roll down a plurality of inclined members 119, which are secured to structure 64 and to a baling rack 121 having a plurality of semi-circular rack members 122. In order to prevent further rods from dropping into the baling rack while the baling operation is being carried out there are preferably provided a plurality of stop bars 124 which are slidably mounted at their upper ends in apertures in members 119. At their lower ends, bars 124 are connected to levers 125 which carry weights 126. Levers 125 are secured to a shaft 127, which in turn is journaled in a plurality of brackets 128 secured to the baling rack. Also secured to shaft 127 is a double arm pedal member 131 which is adapted to rock the shaft and actuate the bars into operative and inoperative position. Bars 124 are shown in full line in their inoperative position in Figure 10, and in their operative position in broken lines, and it is apparent that movement of the rods down members 119 will be positively arrested, with the bars in stopping position. When the left-hand end of pedal 131 is depressed the bars are lowered into the full line position and any rods that may have accumulated will be discharged into the baling rack.

*Operation*

Assuming that loading racks C and D are loaded with bars, rods or pipes, they are fed manually by an operator standing on platform E into conveyor A. By reason of the use of two racks, two different groups of bars may be fed into the machine at the same time. The bars are advanced one by one through the blast chamber and completely cleaned, although if desired, and if the rods are sufficiently small, two or more may be fed into the conveyor side by side. As the bars emerge from the blasting chamber, and arrive at the transfer station they engage limit switch 93 which automatically actuates motor 84 or 84a, depending upon the position of switch handle 96, and are transferred laterally to the return conveyors N and O. The rods are now completely cleaned and the return conveyors transport them to rod houses P and Q in which any further reducing, straightening or other finishing action is performed upon them. They are then conveyed to the unloading station, where they are ejected into the baling racks and prepared for shipment.

By reason of the novel double loading station and transfer mechanism the apparatus is extremely flexible and will rapidly turn out work of various sizes. For instance, the finishing mechanism is the rod houses is adapted to handle, without changing dies, only one sized rod, but as two loading racks are used, and a selective transfer mechanism is employed to divert the rods to either of the two return conveyors, a different sized finishing mechanism may be located in each rod house and the transfer mechanism utilized to segregate the rods, diverting the large size rods to one rod house and the small rods to the other. Therefore, the machine may be used to turn out a batch of rods of one size, and switch 96 being held in one position to divert the rods to one rod house. A batch of rods of a different size may then be handled and switch 96 be held in its other position to divert the rods to the other rod house. If a large quantity of uniform sized rods are treated both racks C and D may be loaded with them, whereas if small batches are handled, rods of one size will be loaded onto rack C, and rods of another size will be loaded on rack D. If assorted sizes are fed through the machine the operator will actuate switch handle 96 to divert the rods to the proper rod house. Although I have shown two return conveyors for feeding rods to two rod houses, three or more return conveyors cooperating with three or more rod houses may be used if desired and the transfer mechanism modified to selectively transport the rods to either of them, and the appended claims are intended to embrace the invention when it assumes this form. Also the various loading transferring and loading mechanisms have been shown as located on opposite sides of the apparatus, but if desired they may be located at different elevations at the same side of the apparatus, without departing from the spirit of the invention.

In Figures 11 to 15, inclusive, I have shown a modified form of apparatus which is particularly adapted for the handling of square, oval or other non-circular section of rods. In this form of the invention, the rods are conveyed by means of a plurality of rolls 141 which are inclined at an angle 142 with the horizontal, whereas in the previous form of the invention their axes were contained in a horizontal plane. Cooperating with rolls 141 are a pair of guide rolls 144 and 145, which are inclined in opposite directions with respect to the direction of rotation of travel of the rods through the apparatus.

As seen more clearly in Figure 11, rolls 144 incline upwardly and forwardly with respect to the direction of travel, whereas rolls 145 incline upwardly and rearwardly with respect to the direction of travel of the work. In the particular embodiment illustrated, the apparatus is particularly adapted for the handling of square or other bars of non-circular section, and with the rolls 141 rotating in the direction indicated in Figures 11, 12 and 15, the rods are translated in the direction indicated by the arrow 146 and each article is simultaneously rotated about its longitudinal axis, as indicated in Figure 15.

Referring to Figure 15, there is shown in place on rolls 141 a square section rod 148 and a round rod 149, and it has been discovered that round rods and square rods may be simultaneously run through the machine providing they are disposed in the relationship shown in Figure 15, but it is to be understood that if desired the machine may be employed for handling solely non-circular section rods or round rods.

With continued reference to Figure 15, rolls 141 tend to advance the rods and simultaneously move them to the right, by reason of their bias with respect to the direction of travel of the work. The square rod encounters roll 145 as it is translated transversely and as the latter inclines away from the conveyor trough, the rod climbs up on the roll as shown in Figure 15, and undergoes rotation in the direction indicated by the arrow shown in that figure. As rod 148 alternately climbs up on roll 145 and is overbalanced and falls back on roll 141, roll 145 is rotated in the direction indicated, and although rotation thereof is intermittent, the only time rolls 145 are not rotated is the instant that the rod tips over and presents another face to the blast. After the rod tips however another corner thereof substantially instantaneously engages rolls 145 and the cycle is repeated.

Round rod 149 is also urged to the right, but by reason of its circular section it merely rotates about its longitudinal axes in the direction indicated by the arrow, and does not shift transversely, due to the inclination of the axes of rolls 141 with the horizontal. In other words, gravity makes it unnecessary to employ guides for separating the rods and restricting sidewise movement of round rods in this form of the invention. Under these conditions, the rolls 144 merely function to keep the rods travelling in a straight line, and I have found that by disposing them at the angles shown, they present a minimum resistance to forward travel and rotation of the rods.

Therefore, when non-circular section rods are running through the machine a round rod may be run simultaneously along the side of the square section bar and they will constantly assume the separated condition shown in Figure 15, neither will interfere with the other, and yet they will be efficiently blasted because as previously pointed out, square rod 148 continuously tends to climb up upon and is rotated through engagement with rollers 145, whereas the round rod 149 remains in the relative position shown in Figure 15 by reason of the action of gravity. I have also discovered that round rods and non-circular section rods will travel side-by-side at substantially the same endwise translational speed regardless of their relative diameters.

Figure 13:
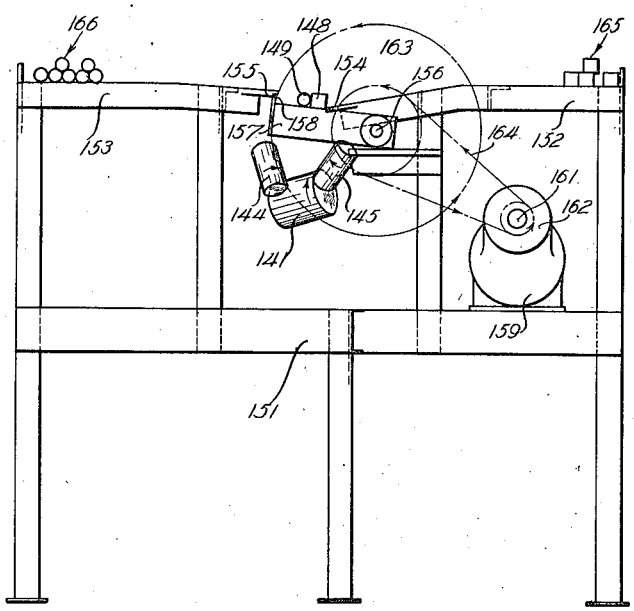
Figure 13 is an end elevational view of the loading mechanism employed in the apparatus of Figures 11 and 12, looking in the direction of travel of the rods.

In order to efficiently feed the rods into the machine, I have developed a special loading mechanism shown more clearly in Figure 13. Supported on a framework 151 is a square bar rack 152 and a round bar rack 153. Rack 152 inclines downwardly and is provided with discharging finger portions 154, whereas rack 153 similarly inclines downwardly and is provided with discharging finger portions 155. Secured to a shaft 156 journaled below rack 152 are a plurality of arms 157 and each arm is provided with a finger 158. The loading arms are actuated by a motor 159 which drives a sprocket 161 through a gear reducer 162. A drive sprocket 163 is secured to shaft 156 and is connected to sprocket 161 by means of a sprocket chain 164.

A supply of square of other non-circular section rods 165 are placed on rack 152, and a supply of circular rods 166 are placed on rack 153 and they may vary in size from five-eighths inch to three and one-sixteenth inches in diameter for the particular machine shown, although it is to be understood that the machine may be designed to handle any desired size of rod or pipe, by properly proportioning its parts.

A square rod is selected from rack 152 and a round rod selected from rack 153 and they are fed onto arms 157 as seen in Figure 13. Rods 148 and 149 are shown in proper side-by-side loading relationship on arms 157. Motor 159 is then actuated preferably by a push button start and stop control to rock arms 157 counterclockwise to deposit rods 148 and 149 upon rollers 141. As the arms descend, fingers 158 prevent rods 149 from escaping before they are properly deposited on the rolls. After arms 157 have deposited the rods on the rolls they continue to rotate and are brought through a full revolution and stop in the full line position shown in Figure 13. They are preferably automatically stopped when they attain this position through a limit switch associated with the circuit for motor 159 in well known manner.

The rods then travel into the blasting cabinet and I have also shown in Figures 11 and 12 a modified form of blast wheel arrangement, wherein a plurality of wheels 168, 169 and 171 throw blast streams down upon the work. In the particular machine shown the effective width of the conveyor "trough" is approximately four inches, and the wheels are located in stepped relationship with respect to the path of travel of the work, so that their blast streams cover the entire width of the conveyor "trough," defined by rolls 141, 144 and 145.

Referring to Figure 12, each blast stream expressed in terms of abrasive particles per unit volume, is made up of a main or concentrated blasting portion 171a, a thinner head portion 171b, and a larger but also thin tail portion 171c. The blast streams of wheels 168 and 169 have similar streams and they have been similarly designated. Wheel 168 rotates clockwise, whereas wheels 169 and 171 rotate counterclockwise, and this is responsible for the particular relationship of streams illustrated.

The abrasive leaves the wheel substantially tangentially when a bladeless wheel is employed and at a slightly greater angle to a tangent when bladed wheels are used.

In the event that single rods are run through the machine in series as distinguished from the side-by-side relationship illustrated in Figures 13 and 15, the wheels are adjusted to most efficiently utilize the abrasive. For instance, if circular section rods are being cleaned, wheel 168, on the high side of the trough, is moved over or "tilted" to dispose its discharge stream at the low side of the trough whereas if square, polygonal or other non-circular section rods are being handled, wheel 171 is tilted to bring its discharge stream up to the high side of the trough. It is therefore seen that the blast streams are fully utilized, they are staggered so as to not interfere one with the other and that the main portion of the stream as well as the head and tail portions are utilized all of the time.

In this form of the invention I have shown an apparatus where the blast cleaning operation is the last operation performed upon the work and therefore no rod houses or return conveyors are used. The rods are conveyed directly to the baling racks 173 and 174 (Fig. 14) as soon as they emerge from the blast chamber. Inclined ways 175 and 176 are associated with the baling racks and they terminate adjacent the trough defined by the conveyor rolls. The rods are selectively lifted from the conveyor trough by an unloading or transfer mechanism that will now be described.

Figure 14:
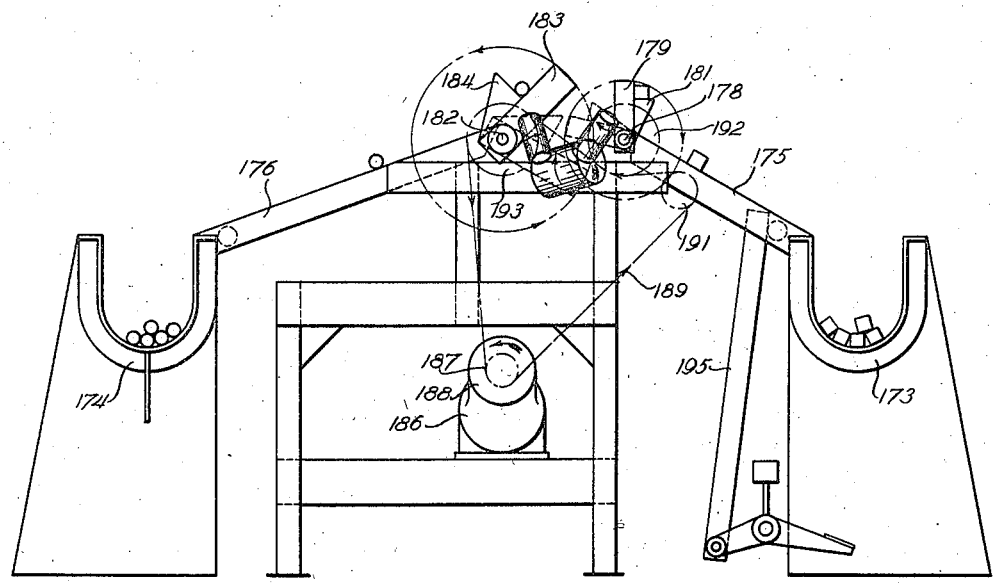
Figure 14 is an end elevational view of the unloading mechanism employed in the apparatus of Figures 11 to 13, inclusive, also looking in the direction of rod travel.

Secured to a shaft 178 are a plurality of arms 179, which are provided with abutment portions 181. As seen in Figure 14, arms 179 are comparatively short and are only capable of lifting the square or non-circular section rods from the trough. Rigidly secured to a second shaft 182 are a plurality of arms 183 having abutment portions 184. Arms 183 are comparatively long and are capable of lifting any and all rods from the trough, but the parts are preferably so designed as to operate in sequence, arms 179 first lifting the non-circular section rods from the trough. Arms 183 then lift the round rods from the trough. To this end a motor 186 driving a sprocket 187 through a gear reduction 188 actuates a sprocket chain 189. The sprocket chain is trained over an idler 191, under a sprocket 192 secured to shaft 178, and over a sprocket 193 connected to shaft 182.

Upon rotation of sprocket 187 in the direction indicated by the arrow, arms 179 will be rocked in a clockwise direction and arms 183 will be rocked in a counterclockwise direction. As indicated in Figure 14, however, the timing is such that arms 179 first lift the non-circular section rods from the trough, and then arms 183 come into play and lift the balance of the rods. As the rods are lifted they are maintained on the arms by means of the abutments until they pass considerably beyond dead center, whereupon they are discharged upon inclined tracks 175 and 176. If desired, each inclined track may have associated with it a rod stopping mechanism 135 exactly similar to that previously described in connection with the first form of the invention, for facilitating the baling operation.

In the device of Figures 11 to 15, inclusive the axes of rolls 141 are disposed in a plane which is inclined to the horizontal, and this is done in order to render the machine more flexible by enabling it to handle both circular and non-circular section rods simultaneously, and it is to be understood that if the machine is merely used to handle one class of rods at one time, the rolls may be horizontal, and a roll assembly of this character is shown in Figure 16.

This machine may be used to clean either circular or non-circular section rods, but the two classes of work cannot be cleaned simultaneously. Rolls 141 are disposed with their axes inclined at an oblique angle with respect to the path of travel of the work, but they lie in a horizontal plane, so that circular rolls will not tend to roll by gravity to either side of the trough. Rolls 145 incline upwardly and outwardly as before, in order to effect rotation of the non-circular section rod 198 as rolls 141 translate it endwise.

Rolls 144 do not possess any rod turning functions but merely operate as guides to keep the rods travelling in a straight path and they are therefore disposed with their axes in a substantially vertical plane. They are however inclined upwardly and rearwardly with respect to the path of travel of the work, for minimizing resistance to rotation and forward travel of the rods, and I have found that the best arrangement involves the use of similar angles, namely, in all forms of the invention the angle which rolls 141 make with the direction of travel of the work should be equal to the angle which rolls 144 and 145 make with the direction of rod travel.

When circular section rods are handled by the apparatus of Figure 16, rotation of rolls 141 urge them to the right, where they engage rolls 145 in a manner similar to non-circular section rod 198, and they are rotated about the longitudinal axes in much the same manner.

When the machine is used solely for the cleaning of circular section work, such as round rods or pipes, the roll arrangement of Figures 17, 18 and 19 may be used. Here rolls 141 are disposed with their axes 201 on a bias with respect to the direction of travel of the work as in the device of Figure 16, and they lie in a substantially horizontal plane. The axes of rolls 144 lie in a vertical plane as in Figure 16, but rolls 145 are also located with their axes in a vertical plane.

Therefore, a plurality of round rods 202 may be handled simultaneously and rotation of rolls 141 urges them to the right and simultaneously advances them, with the result that they rotate about their longitudinal axes in the direction indicated by the arrows in Figure 17.

In Figures 17, 18 and 19 I have also shown the critical angles between the various rolls. The path of travel of the rods is designated as 203, and in Figure 18 it is observed that rolls 141 make an angle 204 with path 203, and in Figure 19 rolls 144 and 145 make angles 205 and 206 respectively with path 203. Angles 204, 205 and 206 are equal and the critical roll angle condition previously described is therefore met. This condition is also true in Figures 11, 15 and 16, but solid geometry considerations make it impossible to illustrate it in those figures.

Another critical angle condition which must be fulfilled in all of the forms of the invention which involve the turning of non-circular section rods, for instance the apparatus of Figures 11 to 15, inclusive, rolls 145, up which the rods climb and tumble over when they become overbalanced, must make an angle of at least forty-five degrees with the horizontal in order to secure the best turning action. Although they may lie in a vertical plane, I preferably locate them in a plane which is inclined somewhat less than ninety degrees to the horizontal for best operation.

Although I prefer to employ cylindrical rolls 141, as it makes it possible to feed two or more rods side-by-side at the same advancing speed, if the machine is to be employed to handle rods in single file, tapered conveyor rolls may be used and biased with respect to path 203, and only one series of guide rolls, located at the side to which the work gravitates, need be used. In other words the rolls cooperate to define a V-shaped trough from which the rods cannot escape. As shown in Figure 20, a tapered conveyor roll 211 is provided with its axis 212 biased to the path of travel of the work, and at an angle to the horizontal, as indicated at 213, such that the upper surface of the roll lies in a plane inclined to the horizontal, indicated by the angle 214. A guide roll 215, generally similar to the guide rolls of Figs. 15 to 19, inclusive, and with its axis lying in substantially a vertical plane parallel to the longitudinal path of travel of the work, is provided adjacent the lower end of the tapered roll 211. Or stationary guide means, as shown in Figures 5, 6, and 7 can be provided in lieu of guide rolls 215.

This modification is of advantage in blasting the exteriors of round or substantially round articles of differing diameters. With conveyor rolls 211 of the proper taper, an article of any diameter within the limits of the machine can be fed therethrough without making any changes in the speed or angularity of the driving rolls. While articles of large diameters have greater areas to be blasted than articles of small diameters, the former are advanced at a proportionately lower speed by reason of their contacting the tapered roll 211 at a point further removed from guide roll 215. For example, an article 216 of a diameter of 8 inches will present the same number of square feet to be blasted per minute as an article 217 having a diameter of 24 inches. Also, in some instances if desired the conveyor rolls may be biased to advance the rods and rotate them in the manner previously described, and guide means may be provided on the rolls themselves, such as a flange or the like, for limiting lateral movement of the rods, without departing from the spirit of the invention.

In all forms of the invention the conveyor rolls have their tops disposed in a common plane and they accordingly define a highly desirable form of supporting and conveying surface, as a large area of contact is provided for effecting efficient driving engagement with the rods, and also, two or more rods may be run simultaneously through the machine. A further very important practical advantage gained by providing a comparatively wide and flat supporting surface for the rods is that in practice many of the rods are not exactly straight, and this roll arrangement permits them to shift from side to side at will, without impeding their speed of advance or rotation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an apparatus for blast cleaning both circular and non-circular elongated articles, a blasting station including means to project a stream of abrasive upon said articles, means providing a generally trough-shaped conveyor for transporting said articles through said blasting station, said trough having a bottom of sufficient width to accommodate a plurality of said articles side by side, said means being operable to advance said articles along said path and simultaneously urge them transversely with respect to the path of travel of said articles, said trough having a side element adjacent one side of said bottom which inclines upwardly and outwardly for engaging the non-circular articles and causing them to tumble backwardly when they have been advanced a predetermined distance transversely over said bottom.

2. The apparatus defined in claim 1, wherein said side element is inclined at an angle of at least 45 degrees to the horizontal.

3. In an apparatus for blast cleaning elongated articles, means to project a stream of abrasive against said articles and provide a blasting zone therefore, a plurality of individual rotatably mounted conveyor rolls of substantial length to support several articles aside of each other, disposed in series and adapted to transport said articles in a rectilinear path through said blasting zone and subject them to the action of said blast stream, the axes of rotation of said rolls being parallel to each other, said rolls being disposed with their peripheries tangent to a common plane, the axis of each of said rolls being biased with respect to said rectilinear path, whereby rotation of said rolls will simultaneously advance said articles endwise and rotate them about their longitudinal axes and also tend to urge them transversely of said rectilinear path, a plurality of guide rolls mounted for rotation adjacent the ends of said conveyor rolls and operable to limit transverse movement of said articles, said guide rolls being rotatable about substantially parallel axes and having their peripheries tangent to a common plane disposed parallel to said rectilinear path and inclining upwardly and outwardly away therefrom, for facilitating rotation of non-circular section articles upon said conveyor rolls, the plane containing the axes of said conveyor rolls being inclined upwardly toward said guide rolls, to cause circular section articles supported upon said conveyor rolls to gravitate away from said guide rolls.

4. The apparatus defined in claim 2 wherein said means providing a generally trough-shaped conveyor includes a plurality of conveyor rolls arranged with their axes biased across the path of lengthwise movement of said articles and in a plane to position the article contacting surfaces of said rolls in a plane inclined downwardly and away from said side element.

ROBERT B. HUYETT.